(12) United States Patent
DeVaul et al.

(10) Patent No.: US 8,820,678 B2
(45) Date of Patent: Sep. 2, 2014

(54) RELATIVE POSITIONING OF BALLOONS WITH ALTITUDE CONTROL AND WIND DATA

(75) Inventors: Richard Wayne DeVaul, Mountain View, CA (US); Eric Teller, San Francisco, CA (US); Clifford L. Biffle, Berkeley, CA (US); Josh Weaver, San Jose, CA (US); Dan Piponi, Oakland, CA (US)

(73) Assignee: Google Inc., Mountain View, CA (US)

( * ) Notice: Subject to any disclaimer, the term of this patent is extended or adjusted under 35 U.S.C. 154(b) by 220 days.

(21) Appl. No.: 13/346,637

(22) Filed: Jan. 9, 2012

(65) Prior Publication Data
US 2013/0175391 A1     Jul. 11, 2013

(51) Int. Cl.
*B64B 1/02* (2006.01)
*B64B 1/06* (2006.01)
*G05D 1/02* (2006.01)

(52) U.S. Cl.
USPC ............................... 244/96; 701/10; 701/300

(58) Field of Classification Search
USPC ........... 455/431; 244/96, 26, 30, 31; 701/3, 4, 701/10, 300
See application file for complete search history.

(56) References Cited

U.S. PATENT DOCUMENTS

| | | | |
|---|---|---|---|
| 2,790,479 A | 4/1957 | Mastenbrook | |
| 3,452,949 A | 7/1969 | Maloney et al. | |
| 3,742,358 A * | 6/1973 | Cesaro | ............................. 455/9 |
| 4,366,936 A | 1/1983 | Ferguson | |
| 5,666,647 A * | 9/1997 | Maine | ........................... 455/12.1 |
| 6,167,263 A * | 12/2000 | Campbell | ...................... 455/431 |
| 6,324,398 B1 | 11/2001 | Lanzerotti et al. | |
| 6,628,941 B2 | 9/2003 | Knoblach | |
| 6,830,222 B1 | 12/2004 | Nock et al. | |
| 6,857,601 B2 | 2/2005 | Akahori | |
| 6,904,335 B2 * | 6/2005 | Solomon | ....................... 700/247 |
| 7,046,934 B2 | 5/2006 | Badesha | |
| 7,356,390 B2 | 4/2008 | Knoblach | |
| 7,567,779 B2 * | 7/2009 | Seligsohn et al. | ........... 455/12.1 |
| 7,913,948 B2 | 3/2011 | Porter | |
| 7,948,426 B2 | 5/2011 | Pevler | |
| 8,061,648 B2 | 11/2011 | Lachenmeier | |

(Continued)

OTHER PUBLICATIONS

PCT International Search Report and Written Opinion, PCT International Application No. PCT/US2013/020531 dated Apr. 30, 2013.

(Continued)

*Primary Examiner* — Philip J Bonzell
(74) *Attorney, Agent, or Firm* — McDonnell Boehnen Hulbert & Berghoff LLP

(57) ABSTRACT

The positions of balloons in a communication network of balloons, such as a mesh network of high-altitude balloons, may be adjusted relative to one another in order to try to maintain a desired network topology. In one approach, the position of each balloon may be adjusted relative to one or more neighbor balloons. For example, the locations of a target balloon and one or more neighbor balloons may be determined. A desired movement of the target balloon may then be determined based on the locations of the one or more neighbor balloons relative to the location of the target balloon. The target balloon may be controlled based on the desired movement. In some embodiments, the altitude of the target balloon may be controlled in order to expose the target balloon to ambient winds that are capable of producing the desired movement of the target balloon.

24 Claims, 6 Drawing Sheets

(56) References Cited

U.S. PATENT DOCUMENTS

| | | | |
|---|---|---|---|
| 2002/0072361 A1 | 6/2002 | Knoblach et al. | |
| 2003/0236070 A1* | 12/2003 | Seligsohn et al. | ............ 455/12.1 |
| 2004/0065773 A1 | 4/2004 | Morales | |
| 2005/0173591 A1 | 8/2005 | Colting | |
| 2006/0000945 A1 | 1/2006 | Voss | |
| 2006/0003698 A1 | 1/2006 | Seligsohn et al. | |
| 2010/0039984 A1 | 2/2010 | Brownrigg | |

OTHER PUBLICATIONS

Joachim Horwath et al., Broadband Backhaul Communication for Stratospheric Platforms: The Stratospheric Optical Payload Experiment (STROPEX), Society of Photo-Optical Instrumentation Engineers (SPIE), 2006, vol. 6304.
Dirk Giggenbach et al., Optical Free-Space Communications Downlinks from Stratospheric Platforms—Overview on STROPEX, the Optical Communications Experiment of CAPANINA, 14th IST Mobile & Wireless communications Summit, Jun. 2005, No. 483, Dresden, Germany.
Anthony S. Acampora et al., A Broadband Wireless Access Network Based on Mesh-Connected Free-Space Optical Links, IEEE Personal Communications, Oct. 1999, 1070-9916/99, 62-65.
J. Thornton et al., Broadband communications from a high-altitude platform: the European HeliNet programme, Electronics & Communication Engineering Journal, Jun. 2001, 138-144.
Jayasri Akella et al., Building Blocks for Mobile Free-Space-Optical Networks, IEEE, 2005, 0/7803-9019-9/05.
D. Grace et al., CAPANINA—Communications from Aerial Platform Networks Delivering Broadband Information for All, 14th IST Mobile & Wireless Communications Summit, Jun. 2005, No. 252, Dresden, Germany.
Mihael Mohorcic et al., Evaluation of Wavelength Requirements for Stratospheric Optical Transport Networks, Journal of Communications, Sep. 2009, vol. 4, No. 8, 588-596.
Carolina Fortuna et al., HAP based optical transport network design, Proceedings of the 15th International Electrotechnical and Computer Science Conference (ERK) Sep. 2006.
Alejandro Aragon-Zavala et al., High-Altitude Platforms for Wireless Communications, John Wiley & Sons, Ltd., 2008, pp. C1-80.
Alejandro Aragon-Zavala et al., High-Altitude Platforms for Wireless Communications, John Wiley & Sons, Ltd., 2008, pp. 81-158.
Alejandro Aragon-Zavala et al., High-Altitude Platforms for Wireless Communications, John Wiley & Sons, Ltd., 2008, pp. 159-241.
A. Biswas et al., Deep Space Optical Communications Link Availability and Data Volume, Free-Space Laser Communication Technologies XVI, San Jose, CA, Jan. 2004.
D. Giggenbach et al., Optical Data Downlinks from Earth Observation Platforms, Proceedings of the SPIE, 2009, vol. 7199.
David Grace et al., Integrating Users into the Wider Broadband Network via High Altitude Platforms, IEEE Wireless Communications, 1536-1286/05, Oct. 2005.
Jayasri Akella et al., Multi-channel Communication in Free-Space Optical Networks for the Last-mile, available online at: http://networks.ecse.rpi.edu/~sri/papers/Array-lanman07.pdf (last visited Jan. 18, 2012).
Alan E. Willner et al., Physical Layer Routing in Free-Space Optical Networks, LEOS, available online at: http:// photonicssociety.org/newsletters/oct05/physical_layer.html (last visited Jan. 18, 2012).
Justin Mullins, NASA Develops 'Smart' Weather Balloons for Launch Sites, NewScientist, May 23, 2007.
James Hutchinson, Mobile Mesh Network Finds Interest in NGOs, available online at: http://www.computerworld.com.au/article/374682/mobile_mesh_network_finds_interest_ngos/ (last visited Jan. 17, 2012).
Dung Dinh Luong, et al., Network Architecture and Protocols, CAPANINA, Oct. 16, 2006, pp. 1-83.
Dung Dinh Luong, et al., Network Architecture and Protocols, CAPANINA, Oct. 16, 2006, pp. 84-172.
In Keun Son, Design and Optimization of Free Space Optical Networks, Auburn University, Dec. 13, 2010, pp. 1-78, Auburn, Alabama.
In Keun Son, Design and Optimization of Free Space Optical Networks, Auburn University, Dec. 13, 2010, pp. 79-147, Auburn, Alabama.
Hui Zang, et al., A Review of Routing and Wavelength Assignment Approaches for Wavelength-Routed Optical WDM Networks, Optical Networks Magazine, Jan. 2000, pp. 47-60.
Scott Bloom, et al., The Last-Mile Solution: Hybrid FSO Radio, AirFiber, Inc., May 2002, pp. 1-20.
Di Wang, et al., Throughput Capacity of Hybrid Radio-Frequency and Free-Space-Optical (RF/FSO) Multi-Hop Networks, Department of Electrical, Computer and Systems Engineering, Rensselaer Polytechnic Institute, pp. 1-8.
Mohammed N. Smadi, et al., Free-Space Optical Gateway Placement in Hybrid Wireless Mesh Networks, Journal of Lightwave Technology, Jul. 15, 2009, vol. 27, No. 14, pp. 2688-2697.
Roy Eddleston, et al., Mesh Networking Soars to New Heights, available online at: http://www.airballooningevent.com/mesh-networking-soars-to-new-heights (last visited Jan. 18, 2012).
Barry William Walsh, Balloon Network Test Successful, available online at: http://17.taylor.edu/community/news/news_detail.shtml?inode=14221 (last visited Jan. 18, 2012).
T.C. Tozer et al., High-altitude platforms for wireless communications, Electronics & Communication Engineering Journal, Jun. 2001, 127-137.
G. Ellinas, et al., Network Control and Management Challenges in Opaque Networks Utilizing Transparent Optical Switches, available online at: http://www.jaywalkertc.com/publications/JAW_live_papers/IEEE_Opt_Comm.pdf (last visited Jan. 18, 2012).
Asuman E. Ozdaglar, et al., Routing and Wavelength Assignment in Optical Networks, available online at: http://web.mit.edu/asuman/www/documents/RWA_Paper.pdf (last visited Jan. 18, 2012).
David Grace et al., Broadband Communications via High Altitude Platforms, John Wiley & Sons, Ltd., 2011, pp. 49-73.
David Grace et al., Broadband Communications via High Altitude Platforms, John Wiley & Sons, Ltd., 2011, pp. 75-113.
David Grace et al., Broadband Communications via High Altitude Platforms, John Wiley & Sons, Ltd., 2011, pp. 219-238.
Balaram et al., Autonomous Mobility, Navigation and Control for Venus Aerobots, International Symposium on Artificial Intelligence, Optics and Automation in Space, Jul. 14, 1997, Tokyo, Japan.
Andrew S. Carten Jr., An Investigation of the Applicability of High Altitude, Lighter-Than-Air (LTA) Vehicles to the Tactical Communications Relay Problem, Air Force Cambridge Research Labs, Hanscom Air Force Base, Aug. 20, 1974, Massachusetts.
Michael Corbett et al., High Altitude Balloon Project, Wright State University, Engineering Design, Mar. 11, 2006, Dayton, Ohio.

* cited by examiner

RELATIVE POSITIONING OF BALLOONS WITH ALTITUDE CONTROL AND WIND DATA

BACKGROUND

Unless otherwise indicated herein, the materials described in this section are not prior art to the claims in this application and are not admitted to be prior art by inclusion in this section.

Computing devices such as personal computers, laptop computers, tablet computers, cellular phones, and countless types of Internet-capable devices are increasingly prevalent in numerous aspects of modern life. As such, the demand for data connectivity via the Internet, cellular data networks, and other such networks, is growing. However, there are many areas of the world where data connectivity is still unavailable, or if available, is unreliable and/or costly. Accordingly, additional network infrastructure is desirable.

SUMMARY

In a first aspect, a method is provided. The method includes determining a location of a target balloon and determining locations of one or more neighbor balloons relative to the location of the target balloon. The target balloon includes a communication system that is operable for data communication with at least one of the one or more neighbor balloons. The method further includes determining a desired movement of the target balloon based on the locations of the one or more neighbor balloons relative to the location of the target balloon and controlling the target balloon based on the desired movement of the target balloon.

In a second aspect, a non-transitory computer readable medium is provided. The non-transitory computer readable medium has stored therein instructions executable by a computing device to cause the computing device to perform functions. The functions include: (a) determining a location of a target balloon; (b) determining locations of one or more neighbor balloons relative to the location of the target balloon; (c) determining a desired movement of the target balloon based on the locations of the one or more neighbor balloons relative to the location of the target balloon; and (d) controlling the target balloon based on the desired movement of the target balloon.

In a third aspect, a balloon is provided. The balloon includes a communication system operable for data communications with one of more other balloons in a mesh network of balloons. The balloon further includes a controller coupled to the communication system. The controller is configured to: (a) determine the balloon's location; (b) determine locations of one or more neighbor balloons relative to the balloon's location, wherein the one or more neighbor balloons are in the mesh network of balloons; and (c) determine a desired movement of the balloon based on the locations of the one or more neighbor balloons relative to the balloon's location.

In a fourth aspect, a method is provided. The method includes identifying a plurality of goodness factors for a given balloon in a high-altitude balloon network, and determining a plurality of goodness scores for the given balloon. Each goodness score relates to a respective goodness factor in the plurality of goodness factors. The method also includes determining a current overall goodness for the given balloon as a function of the plurality of goodness scores for the given balloon. The method further includes identifying a plurality of actions that could be taken by the given balloon and determining, for each action, a respective overall goodness resulting from that action. Still further, the method includes selecting, from among the plurality of actions, an action that results in an overall goodness that is higher than the current overall goodness and controlling the given balloon to undertake the selected action.

In a fifth aspect, a non-transitory computer readable medium is provided. The non-transitory computer readable medium has stored therein instructions executable by a computing device to cause the computing device to perform functions. The functions include: (a) identifying a plurality of goodness factors for a given balloon in a high-altitude balloon network; (b) determining a plurality of goodness scores for the given balloon, where each goodness score relates to a respective goodness factor in the plurality of goodness factors; (c) determining a current overall goodness for the given balloon as a function of the plurality of goodness scores for the given balloon; (d) identifying a plurality of actions that could be taken by the given balloon; (e) determining, for each action, a respective overall goodness resulting from that action; (f) selecting, from among the plurality of actions, an action that results in an overall goodness that is higher than the current overall goodness; and (g) controlling the given balloon to undertake the selected action.

These as well as other aspects, advantages, and alternatives, will become apparent to those of ordinary skill in the art by reading the following detailed description, with reference where appropriate to the accompanying drawings.

DETAILED DESCRIPTION

Figure 1:
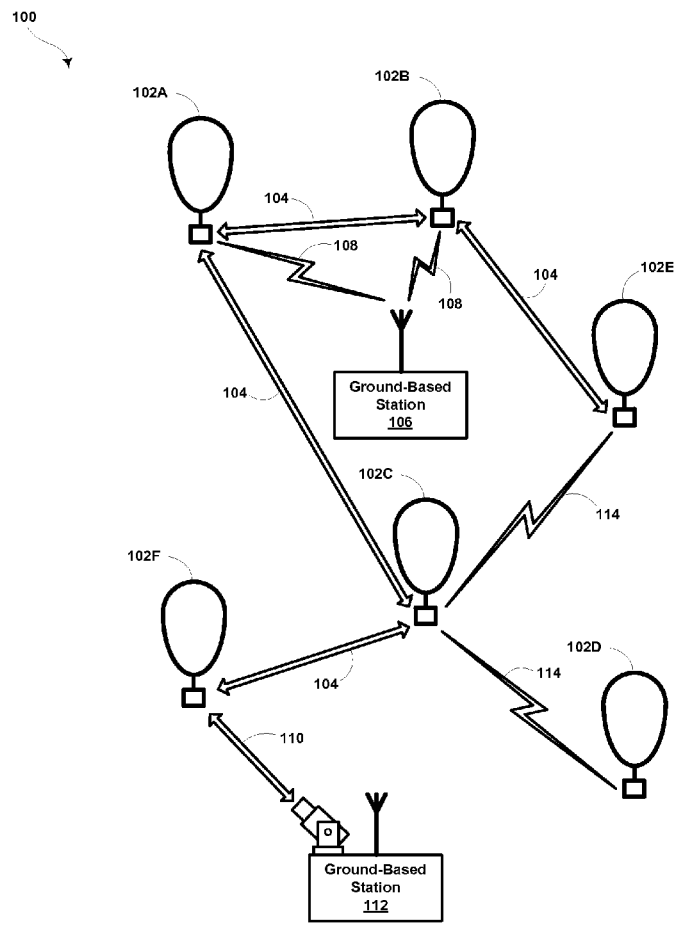
FIG. 1 is a simplified block diagram illustrating a balloon network, according to an example embodiment.

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments may include more or less of each element shown in a given Figure. Further, some of the illustrated elements may be combined or omitted. Yet further, an example embodiment may include elements that are not illustrated in the Figures.

1. Overview

Example embodiments help to provide a data network that includes a plurality of balloons; for example, a mesh network formed by high-altitude balloons deployed in the stratosphere. Since winds in the stratosphere may affect the locations of the balloons in a differential manner, each balloon in an example network may be configured to change its horizontal position by adjusting its vertical position (i.e., altitude). For instance, by adjusting its altitude, a balloon may be able find winds that will carry it horizontally (e.g., latitudinally and/or longitudinally) to a desired horizontal location.

Further, in an example balloon network, the balloons may communicate with one another using free-space optical communications. For instance, the balloons may be configured for optical communications using ultra-bright LEDs (which are also referred to as "high-power" or "high-output" LEDs). In some instances, lasers could be used instead of or in addition to LEDs, although regulations for laser communications may restrict laser usage. In addition, the balloons may communicate with ground-based station(s) using radio-frequency (RF) communications.

In some embodiments, a high-altitude-balloon network may be homogenous. That is, the balloons in a high-altitude-balloon network could be substantially similar to each other in one or more ways. More specifically, in a homogenous high-altitude-balloon network, each balloon is configured to communicate with one or more other balloons via free-space optical links. Further, some or all of the balloons in such a network, may additionally be configured to communicate with ground-based and/or satellite-based station(s) using RF and/or optical communications. Thus, in some embodiments, the balloons may be homogenous in so far as each balloon is configured for free-space optical communication with other balloons, but heterogeneous with regard to RF communications with ground-based stations.

In other embodiments, a high-altitude-balloon network may be heterogeneous, and thus may include two or more different types of balloons. For example, some balloons in a heterogeneous network may be configured as super-nodes, while other balloons may be configured as sub-nodes. It is also possible that some balloons in a heterogeneous network may be configured to function as both a super-node and a sub-node. Such balloons may function as either a super-node or a sub-node at a particular time, or, alternatively, act as both simultaneously depending on the context. For instance, an example balloon could aggregate search requests of a first type to transmit to a ground-based station. The example balloon could also send search requests of a second type to another balloon, which could act as a super-node in that context. Further, some balloons, which may be super-nodes in an example embodiment, can be configured to communicate via optical links with ground-based stations and/or satellites.

In n example configuration, the super-node balloons may be configured to communicate with nearby super-node balloons via free-space optical links. However, the sub-node balloons may not be configured for free-space optical communication, and may instead be configured for some other type of communication, such as RF communications. In that case, a super-node may be further configured to communicate with sub-nodes using RF communications. Thus, the sub-nodes may relay communications between the super-nodes and one or more ground-based stations using RF communications. In this way, the super-nodes may collectively function as backhaul for the balloon network, while the sub-nodes function to relay communications from the super-nodes to ground-based stations. Other differences could be present between balloons in a heterogeneous balloon network.

The present disclosure describes various example embodiments of apparatuses, methods, and functions executable by a computer-readable medium that are generally operable to determine a desired movement of a target balloon, based on the locations of one or more neighbor balloons relative to the location of the target balloon, and to control the target balloon based on the desired movement.

In some embodiments, a potential energy function may be defined that assigns a potential energy to the target balloon as a function of the locations of the one or more neighbor balloons and the location of the target balloon. A gradient of the potential energy function may be determined, and the desired movement of the target balloon may be determined based on the gradient.

In some embodiments, the desired movement of the target balloon is a horizontal movement that may be achieved by controlling the altitude of the target balloon. For example, wind data and/or predictive models may be used to determine that ambient winds with a velocity that is suitable to achieve the desired horizontal movement are likely to be available at a particular altitude. The altitude of the target balloon may then be adjusted to attain the particular altitude.

2. Example Balloon Networks

FIG. 1 is a simplified block diagram illustrating a balloon network 100, according to an example embodiment. As shown, balloon network 100 includes balloons 102A to 102F, which are configured to communicate with one another via free-space optical links 104. Balloons 102A to 102F could additionally or alternatively be configured to communicate with one another via RF links 114. Balloons 102A to 102F may collectively function as a mesh network for packet-data communications. Further, at least some of balloons 102A and 102B may be configured for RF communications with ground-based stations 106 and 112 via respective RF links 108. Further, some balloons, such as balloon 102F, could be configured to communicate via optical link 110 with ground-based station 112.

In an example embodiment, balloons 102A to 102F are high-altitude balloons, which are deployed in the stratosphere. At moderate latitudes, the stratosphere includes altitudes between approximately 10 kilometers (km) and 50 km altitude above the surface. At the poles, the stratosphere starts at an altitude of approximately 8 km. In an example embodiment, high-altitude balloons may be generally configured to operate in an altitude range within the stratosphere that has relatively low wind speed (e.g., between 5 and 20 miles per hour (mph)).

More specifically, in a high-altitude-balloon network, balloons 102A to 102F may generally be configured to operate at altitudes between 18 km and 25 km (although other altitudes are possible). This altitude range may be advantageous for several reasons. In particular, this layer of the stratosphere generally has relatively low wind speeds (e.g., winds between 5 and 20 mph) and relatively little turbulence. Further, while the winds between 18 km and 25 km may vary with latitude and by season, the variations can be modeled in a reasonably accurate manner. Additionally, altitudes above 18 km are typically above the maximum flight level designated for commercial air traffic. Therefore, interference with commercial flights is not a concern when balloons are deployed between 18 km and 25 km.

To transmit data to another balloon, a given balloon 102A to 102F may be configured to transmit an optical signal via an optical link 104. In an example embodiment, a given balloon 102A to 102F may use one or more high-power light-emitting diodes (LEDs) to transmit an optical signal. Alternatively, some or all of balloons 102A to 102F may include laser systems for free-space optical communications over optical links 104. Other types of free-space optical communication are possible. Further, in order to receive an optical signal from another balloon via an optical link 104, a given balloon 102A to 102F may include one or more optical receivers. Additional details of example balloons are discussed in greater detail below, with reference to FIG. 3.

In a further aspect, balloons 102A to 102F may utilize one or more of various different RF air-interface protocols for communication with ground-based stations 106 and 112 via respective RF links 108. For instance, some or all of balloons 102A to 102F may be configured to communicate with ground-based stations 106 and 112 using protocols described in IEEE 802.11 (including any of the IEEE 802.11 revisions), various cellular protocols such as GSM, CDMA, UMTS, EV-DO, WiMAX, and/or LTE, and/or one or more propriety protocols developed for balloon-ground RF communication, among other possibilities.

In a further aspect, there may be scenarios where RF links 108 do not provide a desired link capacity for balloon-to-ground communications. For instance, increased capacity may be desirable to provide backhaul links from a ground-based gateway, and in other scenarios as well. Accordingly, an example network may also include downlink balloons, which could provide a high-capacity air-ground link.

For example, in balloon network 100, balloon 102F is configured as a downlink balloon. Like other balloons in an example network, a downlink balloon 102F may be operable for optical communication with other balloons via optical links 104. However, a downlink balloon 102F may also be configured for free-space optical communication with a ground-based station 112 via an optical link 110. Optical link 110 may therefore serve as a high-capacity link (as compared to an RF link 108) between the balloon network 100 and the ground-based station 112.

Note that in some implementations, a downlink balloon 102F may additionally be operable for RF communication with ground-based stations 106. In other cases, a downlink balloon 102F may only use an optical link for balloon-to-ground communications. Further, while the arrangement shown in FIG. 1 includes just one downlink balloon 102F, an example balloon network can also include multiple downlink balloons. On the other hand, a balloon network can also be implemented without any downlink balloons.

In other implementations, a downlink balloon may be equipped with a specialized, high-bandwidth RF communication system for balloon-to-ground communications, instead of, or in addition to, a free-space optical communication system. The high-bandwidth RF communication system may take the form of an ultra-wideband system, which may provide an RF link with substantially the same capacity as one of the optical links 104. Other forms are also possible.

Ground-based stations, such as ground-based stations 106 and/or 112, may take various forms. Generally, a ground-based station may include components such as transceivers, transmitters, and/or receivers for communication via RF links and/or optical links with a balloon network. Further, a ground-based station may use various air-interface protocols in order to communicate with a balloon 102A to 102F over an RF link 108. As such, ground-based stations 106 and 112 may be configured as an access point via which various devices can connect to balloon network 100. Ground-based stations 106 and 112 may have other configurations and/or serve other purposes without departing from the scope of the invention.

In a further aspect, some or all of balloons 102A to 102F could be configured to establish a communication link with space-based satellites in addition to, or as an alternative to, a ground-based communication link. In some embodiments, a balloon may communicate with a satellite via an optical link. However, other types of satellite communications are possible.

Further, some ground-based stations, such as ground-based stations 106 and 112, may be configured as gateways between balloon network 100 and one or more other networks. Such ground-based stations 106 and 112 may thus serve as an interface between the balloon network and the Internet, a cellular service provider's network, and/or other types of networks. Variations on this configuration and other configurations of ground-based stations 106 and 112 are also possible.

2a) Mesh Network Functionality

As noted, balloons 102A to 102F may collectively function as a mesh network. More specifically, since balloons 102A to 102F may communicate with one another using free-space optical links, the balloons may collectively function as a free-space optical mesh network.

In a mesh-network configuration, each balloon 102A to 102F may function as a node of the mesh network, which is operable to receive data directed to it and to route data to other balloons. As such, data may be routed from a source balloon to a destination balloon by determining an appropriate sequence of optical links between the source balloon and the destination balloon. These optical links may be collectively referred to as a "lightpath" for the connection between the source and destination balloons. Further, each of the optical links may be referred to as a "hop" on the lightpath.

To operate as a mesh network, balloons 102A to 102F may employ various routing techniques and self-healing algorithms. In some embodiments, a balloon network 100 may employ adaptive or dynamic routing, where a lightpath between a source and destination balloon is determined and set-up when the connection is needed, and released at a later time. Further, when adaptive routing is used, the lightpath may be determined dynamically depending upon the current state, past state, and/or predicted state of the balloon network.

In addition, the network topology may change as the balloons 102A to 102F move relative to one another and/or relative to the ground. Accordingly, an example balloon network 100 may apply a mesh protocol to update the state of the network as the topology of the network changes. For example, to address the mobility of the balloons 102A to 102F, balloon network 100 may employ and/or adapt various techniques that are employed in mobile ad hoc networks (MANETs). Other examples are possible as well.

In some implementations, a balloon network 100 may be configured as a transparent mesh network. More specifically, in a transparent balloon network, the balloons may include components for physical switching that is entirely optical, without any electrical components involved in the physical routing of optical signals. Thus, in a transparent configuration with optical switching, signals travel through a multi-hop lightpath that is entirely optical.

In other implementations, the balloon network 100 may implement a free-space optical mesh network that is opaque. In an opaque configuration, some or all balloons 102A to 102F may implement optical-electrical-optical (OEO) switching. For example, some or all balloons may include optical cross-connects (OXCs) for OEO conversion of optical signals. Other opaque configurations are also possible. Additionally, network configurations are possible that include routing paths with both transparent and opaque sections.

In a further aspect, balloons in an example balloon network 100 may implement wavelength division multiplexing (WDM), which may help to increase link capacity. When WDM is implemented with transparent switching, physical lightpaths through the balloon network may be subject to the "wavelength continuity constraint." More specifically, because the switching in a transparent network is entirely optical, it may be necessary to assign the same wavelength for all optical links on a given lightpath.

An opaque configuration, on the other hand, may avoid the wavelength continuity constraint. In particular, balloons in an opaque balloon network may include the OEO switching systems operable for wavelength conversion. As a result, balloons can convert the wavelength of an optical signal at each hop along a lightpath. Alternatively, optical wavelength conversion could take place at only selected hops along the lightpath.

Further, various routing algorithms may be employed in an opaque configuration. For example, to determine a primary lightpath and/or one or more diverse backup lightpaths for a given connection, example balloons may apply or consider shortest-path routing techniques such as Dijkstra's algorithm and k-shortest path, and/or edge and node-diverse or disjoint routing such as Suurballe's algorithm, among others. Additionally or alternatively, techniques for maintaining a particular quality of service (QoS) may be employed when determining a lightpath. Other techniques are also possible.

2b) Station-Keeping Functionality

In an example embodiment, a balloon network 100 may implement station-keeping functions to help provide a desired network topology. For example, station-keeping may involve each balloon 102A to 102F maintaining and/or moving into a certain position relative to one or more other balloons in the network (and possibly in a certain position relative to the ground). As part of this process, each balloon 102A to 102F may implement station-keeping functions to determine its desired positioning within the desired topology, and if necessary, to determine how to move to the desired position.

The desired topology may vary depending upon the particular implementation. In some cases, balloons may implement station-keeping to provide a substantially uniform topology. In such cases, a given balloon 102A to 102F may implement station-keeping functions to position itself at substantially the same distance (or within a certain range of distances) from adjacent balloons in the balloon network 100.

In other cases, a balloon network 100 may have a non-uniform topology. For instance, example embodiments may involve topologies where balloons are distributed more or less densely in certain areas, for various reasons. As an example, to help meet the higher bandwidth demands that are typical in urban areas, balloons may be clustered more densely over urban areas. For similar reasons, the distribution of balloons may be denser over land than over large bodies of water. Many other examples of non-uniform topologies are possible.

In a further aspect, the topology of an example balloon network may be adaptable. In particular, station-keeping functionality of example balloons may allow the balloons to adjust their respective positioning in accordance with a change in the desired topology of the network. For example, one or more balloons could move to new positions to increase or decrease the density of balloons in a given area. Other examples are possible.

In some embodiments, a balloon network 100 may employ an energy function to determine if and/or how balloons should move to provide a desired topology. In particular, the state of a given balloon and the states of some or all nearby balloons may be input to an energy function. The energy function may apply the current states of the given balloon and the nearby balloons to a desired network state (e.g., a state corresponding to the desired topology). A vector indicating a desired movement of the given balloon may then be determined by determining the gradient of the energy function. The given balloon may then determine appropriate actions to take in order to effectuate the desired movement. For example, a balloon may determine an altitude adjustment or adjustments such that winds will move the balloon in the desired manner.

2c) Control of Balloons in a Balloon Network

Figure 2:
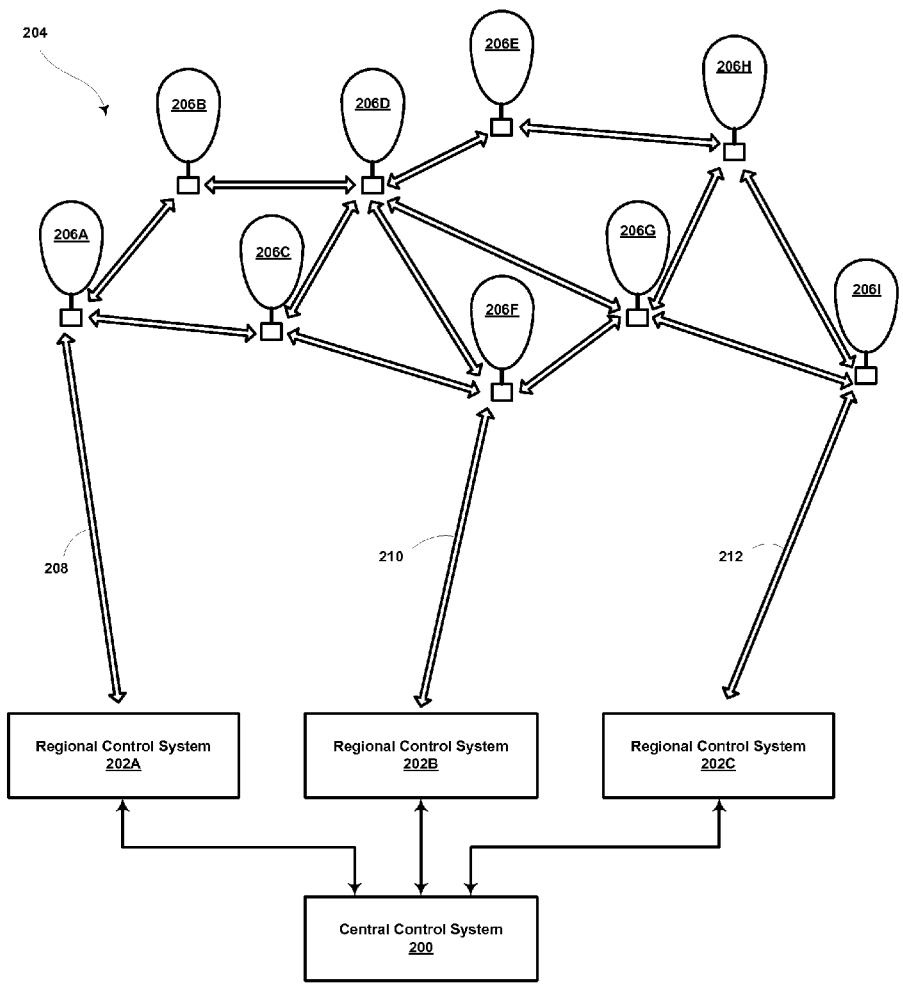
FIG. 2 is a block diagram illustrating a balloon-network control system, according to an example embodiment.

In some embodiments, mesh networking and/or station-keeping functions may be centralized. For example, FIG. 2 is a block diagram illustrating a balloon-network control system, according to an example embodiment. In particular, FIG. 2 shows a distributed control system, which includes a central control system 200 and a number of regional control-systems 202A to 202B. Such a control system may be configured to coordinate certain functionality for balloon network 204, and as such, may be configured to control and/or coordinate certain functions for balloons 206A to 206I.

In the illustrated embodiment, central control system 200 may be configured to communicate with balloons 206A to 206I via a number of regional control systems 202A to 202C. These regional control systems 202A to 202C may be configured to receive communications and/or aggregate data from balloons in the respective geographic areas that they cover, and to relay the communications and/or data to central control system 200. Further, regional control systems 202A to 202C may be configured to route communications from central control system 200 to the balloons in their respective geographic areas. For instance, as shown in FIG. 2, regional control system 202A may relay communications and/or data between balloons 206A to 206C and central control system 200, regional control system 202B may relay communications and/or data between balloons 206D to 206F and central control system 200, and regional control system 202C may relay communications and/or data between balloons 206G to 206I and central control system 200.

In order to facilitate communications between the central control system 200 and balloons 206A to 206I, certain balloons may be configured as downlink balloons, which are operable to communicate with regional control systems 202A to 202C. Accordingly, each regional control system 202A to 202C may be configured to communicate with the downlink balloon or balloons in the respective geographic area it covers. For example, in the illustrated embodiment, balloons 206A, 206F, and 206I are configured as downlink balloons. As such, regional control systems 202A to 202C may respectively communicate with balloons 206A, 206F, and 206I via optical links 206, 208, and 210, respectively.

In the illustrated configuration, only some of balloons 206A to 206I are configured as downlink balloons. The balloons 206A, 206F, and 206I that are configured as downlink balloons may relay communications from central control system 200 to other balloons in the balloon network, such as balloons 206B to 206E, 206G, and 206H. However, it should be understood that in some implementations, it is possible that all balloons may function as downlink balloons. Further, while FIG. 2 shows multiple balloons configured as downlink balloons, it is also possible for a balloon network to include only one downlink balloon, or possibly even no downlink balloons.

Note that a regional control system 202A to 202C may in fact just be a particular type of ground-based station that is configured to communicate with downlink balloons (e.g., such as ground-based station 112 of FIG. 1). Thus, while not shown in FIG. 2, a control system may be implemented in conjunction with other types of ground-based stations (e.g., access points, gateways, etc.).

In a centralized control arrangement, such as that shown in FIG. 2, the central control system 200 (and possibly regional control systems 202A to 202C as well) may coordinate certain mesh-networking functions for balloon network 204. For example, balloons 206A to 206I may send the central control system 200 certain state information, which the central control system 200 may utilize to determine the state of balloon network 204. The state information from a given balloon may include location data, optical-link information (e.g., the identity of other balloons with which the balloon has established an optical link, the bandwidth of the link, wavelength usage and/or availability on a link, etc.), wind data collected by the balloon, and/or other types of information. Accordingly, the central control system 200 may aggregate state information from some or all of the balloons 206A to 206I in order to determine an overall state of the network.

The overall state of the network may then be used to coordinate and/or facilitate certain mesh-networking functions such as determining lightpaths for connections. For example, the central control system 200 may determine a current topology based on the aggregate state information from some or all of the balloons 206A to 206I. The topology may provide a picture of the current optical links that are available in balloon network and/or the wavelength availability on the links. This topology may then be sent to some or all of the balloons so that a routing technique may be employed to select appropriate lightpaths (and possibly backup lightpaths) for communications through the balloon network 204.

In a further aspect, the central control system 200 (and possibly regional control systems 202A to 202C as well) may also coordinate certain station-keeping functions for balloon network 204. For example, the central control system 200 may input state information that is received from balloons 206A to 206I to an energy function, which may effectively compare the current topology of the network to a desired topology, and provide a vector indicating a direction of movement (if any) for each balloon, such that the balloons can move towards the desired topology. Further, the central control system 200 may use altitudinal wind data to determine respective altitude adjustments that may be initiated to achieve the movement towards the desired topology. The central control system 200 may provide and/or support other station-keeping functions as well.

FIG. 2 shows a distributed arrangement that provides centralized control, with regional control systems 202A to 202C coordinating communications between a central control system 200 and a balloon network 204. Such an arrangement may be useful to provide centralized control for a balloon network that covers a large geographic area. In some embodiments, a distributed arrangement may even support a global balloon network that provides coverage everywhere on earth. Of course, a distributed-control arrangement may be useful in other scenarios as well.

Further, it should be understood that other control-system arrangements are also possible. For instance, some implementations may involve a centralized control system with additional layers (e.g., sub-region systems within the regional control systems, and so on). Alternatively, control functions may be provided by a single, centralized, control system, which communicates directly with one or more downlink balloons.

In some embodiments, control and coordination of a balloon network may be shared by a ground-based control system and a balloon network to varying degrees, depending upon the implementation. In fact, in some embodiments, there may be no ground-based control systems. In such an embodiment, all network control and coordination functions may be implemented by the balloon network itself. For example, certain balloons may be configured to provide the same or similar functions as central control system 200 and/or regional control systems 202A to 202C. Other examples are also possible.

Furthermore, control and/or coordination of a balloon network may be de-centralized. For example, each balloon may relay state information to, and receive state information from, some or all nearby balloons. Further, each balloon may relay state information that it receives from a nearby balloon to some or all nearby balloons. When all balloons do so, each balloon may be able to individually determine the state of the network. Alternatively, certain balloons may be designated to aggregate state information for a given portion of the network. These balloons may then coordinate with one another to determine the overall state of the network.

Further, in some aspects, control of a balloon network may be partially or entirely localized, such that it is not dependent on the overall state of the network. For example, individual balloons may implement station-keeping functions that only consider nearby balloons. In particular, each balloon may implement an energy function that takes into account its own state and the states of nearby balloons. The energy function may be used to maintain and/or move to a desired position with respect to the nearby balloons, without necessarily considering the desired topology of the network as a whole. However, when each balloon implements such an energy function for station-keeping, the balloon network as a whole may maintain and/or move towards the desired topology.

As an example, each balloon A may receive distance information $d_1$ to $d_k$ with respect to each of its k closest neighbors. Each balloon A may treat the distance to each of the k balloons as a virtual spring with vector representing a force direction from the first nearest neighbor balloon i toward balloon A and with force magnitude proportional to $d_i$. The balloon A may sum each of the k vectors and the summed vector is the vector of desired movement for balloon A. Balloon A may attempt to achieve the desired movement by controlling its altitude.

Alternatively, this process could assign the force magnitude of each of these virtual forces equal to $d_i \times d_j$, wherein $d_j$ is proportional to the distance to the second nearest neighbor balloon, for instance. Other algorithms for assigning force magnitudes for respective balloons in a mesh network are possible.

In another embodiment, a similar process could be carried out for each of the k balloons and each balloon could transmit its planned movement vector to its local neighbors. Further rounds of refinement to each balloon's planned movement vector can be made based on the corresponding planned movement vectors of its neighbors. It will be evident to those skilled in the art that other algorithms could be implemented in a balloon network in an effort to maintain a set of balloon spacings and/or a specific network capacity level over a given geographic location.

2d) Example Balloon Configuration

Figure 3:
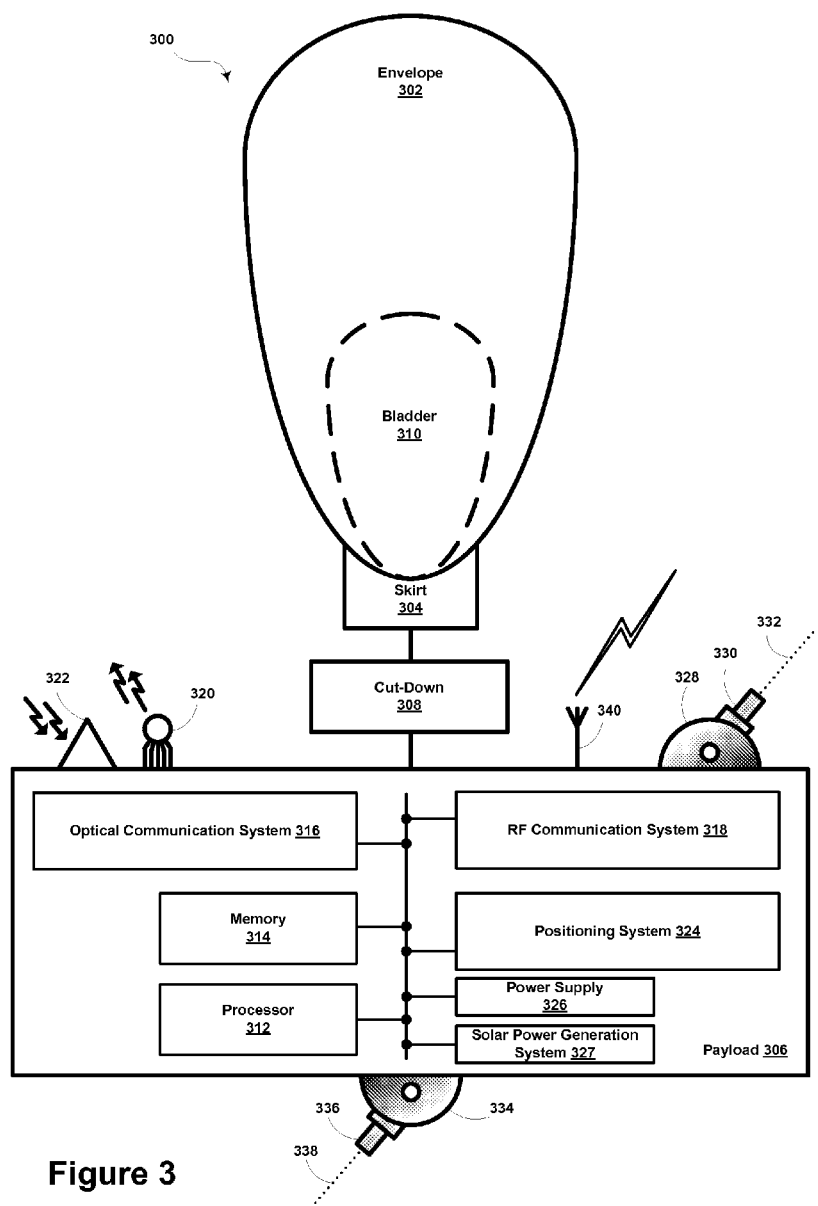
FIG. 3 is a simplified block diagram illustrating a high-altitude balloon, according to an example embodiment.

Various types of balloon systems may be incorporated in an example balloon network. As noted above, an example embodiment may utilize high-altitude balloons, which could typically operate in an altitude range between 18 km and 25 km. FIG. 3 shows a high-altitude balloon 300, according to an example embodiment. As shown, the balloon 300 includes an envelope 302, a skirt 304, a payload 306, and a cut-down system 308, which is attached between the balloon 302 and payload 304.

The envelope 302 and skirt 304 may take various forms, which may be currently well-known or yet to be developed. For instance, the envelope 302 and/or skirt 304 may be made of materials including metalized Mylar or BoPet. Additionally or alternatively, some or all of the envelope 302 and/or skirt 304 may be constructed from a highly-flexible latex material or a rubber material such as chloroprene. Other materials are also possible. Further, the shape and size of the envelope 302 and skirt 304 may vary depending upon the particular implementation. Additionally, the envelope 302 may be filled with various different types of gases, such as helium and/or hydrogen. Other types of gases are possible as well.

The payload 306 of balloon 300 may include a processor 312 and on-board data storage, such as memory 314. The memory 314 may take the form of or include a non-transitory computer-readable medium. The non-transitory computer-readable medium may have instructions stored thereon, which can be accessed and executed by the processor 312 in order to carry out the balloon functions described herein. Thus, processor 312, in conjunction with instructions stored in memory 314, and/or other components, may function as a controller of balloon 300.

The payload 306 of balloon 300 may also include various other types of equipment and systems to provide a number of different functions. For example, payload 306 may include an optical communication system 316, which may transmit optical signals via an ultra-bright LED system 320, and which may receive optical signals via an optical-communication receiver 322 (e.g., a photodiode receiver system). Further, payload 306 may include an RF communication system 318, which may transmit and/or receive RF communications via an antenna system 340.

The payload 306 may also include a power supply 326 to supply power to the various components of balloon 300. The power supply 326 could include a rechargeable battery. In other embodiments, the power supply 326 may additionally or alternatively represent other means known in the art for producing power. In addition, the balloon 300 may include a solar power generation system 327. The solar power generation system 327 may include solar panels and could be used to generate power that charges and/or is distributed by the power supply 326.

The payload 306 may additionally include a positioning system 324. The positioning system 324 could include, for example, a global positioning system (GPS), an inertial navigation system, and/or a star-tracking system. The positioning system 324 may additionally or alternatively include various motion sensors (e.g., accelerometers, magnetometers, gyroscopes, and/or compasses).

The positioning system 324 may additionally or alternatively include one or more video and/or still cameras, and/or various sensors for capturing environmental data.

Some or all of the components and systems within payload 306 may be implemented in a radiosonde or other probe, which may be operable to measure, e.g., pressure, altitude, geographical position (latitude and longitude), temperature, relative humidity, and/or wind speed and/or wind direction, among other information.

As noted, balloon 300 includes an ultra-bright LED system 320 for free-space optical communication with other balloons. As such, optical communication system 316 may be configured to transmit a free-space optical signal by modulating the ultra-bright LED system 320. The optical communication system 316 may be implemented with mechanical systems and/or with hardware, firmware, and/or software. Generally, the manner in which an optical communication system is implemented may vary, depending upon the particular application. The optical communication system 316 and other associated components are described in further detail below.

In a further aspect, balloon 300 may be configured for altitude control. For instance, balloon 300 may include a variable buoyancy system, which is configured to change the altitude of the balloon 300 by adjusting the volume and/or density of the gas in the balloon 300. A variable buoyancy system may take various forms, and may generally be any system that can change the volume and/or density of gas in the envelope 302.

In an example embodiment, a variable buoyancy system may include a bladder 310 that is located inside of envelope 302. The bladder 310 could be an elastic chamber configured to hold liquid and/or gas. Alternatively, the bladder 310 need not be inside the envelope 302. For instance, the bladder 310 could be a rigid bladder that could be pressurized well beyond neutral pressure. The buoyancy of the balloon 300 may therefore be adjusted by changing the density and/or volume of the gas in bladder 310. To change the density in bladder 310, balloon 300 may be configured with systems and/or mechanisms for heating and/or cooling the gas in bladder 310. Further, to change the volume, balloon 300 may include pumps or other features for adding gas to and/or removing gas from bladder 310. Additionally or alternatively, to change the volume of bladder 310, balloon 300 may include release valves or other features that are controllable to allow gas to escape from bladder 310. Multiple bladders 310 could be implemented within the scope of this disclosure. For instance, multiple bladders could be used to improve balloon stability.

In an example embodiment, the envelope 302 could be filled with helium, hydrogen or other lighter-than-air material. The envelope 302 could thus have an associated upward buoyancy force. In such an embodiment, air in the bladder 310 could be considered a ballast tank that may have an associated downward ballast force. In another example embodiment, the amount of air in the bladder 310 could be changed by pumping air (e.g., with an air compressor) into and out of the bladder 310. By adjusting the amount of air in the bladder 310, the ballast force may be controlled. In some embodiments, the ballast force may be used, in part, to counteract the buoyancy force and/or to provide altitude stability.

In other embodiments, the envelope 302 could be substantially rigid and include an enclosed volume. Air could be evacuated from envelope 302 while the enclosed volume is substantially maintained. In other words, at least a partial vacuum could be created and maintained within the enclosed volume. Thus, the envelope 302 and the enclosed volume could become lighter than air and provide a buoyancy force. In yet other embodiments, air or another material could be controllably introduced into the partial vacuum of the enclosed volume in an effort to adjust the overall buoyancy force and/or to provide altitude control.

In another embodiment, a portion of the envelope 302 could be a first color (e.g., black) and/or a first material from the rest of envelope 302, which may have a second color (e.g., white) and/or a second material. For instance, the first color and/or first material could be configured to absorb a relatively larger amount of solar energy than the second color and/or second material. Thus, rotating the balloon such that the first material is facing the sun may act to heat the envelope 302 as well as the gas inside the envelope 302. In this way, the buoyancy force of the envelope 302 may increase. By rotating the balloon such that the second material is facing the sun, the temperature of gas inside the envelope 302 may decrease. Accordingly, the buoyancy force may decrease. In this manner, the buoyancy force of the balloon could be adjusted by changing the temperature/volume of gas inside the envelope 302 using solar energy. In such embodiments, it is possible that a bladder 310 may not be a necessary element of balloon 300. Thus, in various contemplated embodiments, altitude control of balloon 300 could be achieved, at least in part, by adjusting the rotation of the balloon with respect to the sun.

Further, a balloon 306 may include a navigation system (not shown). The navigation system may implement station-keeping functions to maintain position within and/or move to a position in accordance with a desired topology. In particular, the navigation system may use altitudinal wind data to determine altitudinal adjustments that result in the wind carrying the balloon in a desired direction and/or to a desired location. The altitude-control system may then make adjustments to the density of the balloon chamber in order to effectuate the determined altitudinal adjustments and cause the balloon to move laterally to the desired direction and/or to the desired location. Alternatively, the altitudinal adjustments may be computed by a ground-based or satellite-based control system and communicated to the high-altitude balloon. In other embodiments, specific balloons in a heterogeneous balloon network may be configured to compute altitudinal adjustments for other balloons and transmit the adjustment commands to those other balloons.

As shown, the balloon 300 also includes a cut-down system 308. The cut-down system 308 may be activated to separate the payload 306 from the rest of balloon 300. The cut-down system 308 could include at least a connector, such as a balloon cord, connecting the payload 306 to the envelope 302 and a means for severing the connector (e.g., a shearing mechanism or an explosive bolt). In an example embodiment, the balloon cord, which may be nylon, is wrapped with a nichrome wire. A current could be passed through the nichrome wire to heat it and melt the cord, cutting the payload 306 away from the envelope 302.

The cut-down functionality may be utilized anytime the payload needs to be accessed on the ground, such as when it is time to remove balloon 300 from a balloon network, when maintenance is due on systems within payload 306, and/or when power supply 326 needs to be recharged or replaced.

In an alternative arrangement, a balloon may not include a cut-down system. In such an arrangement, the navigation system may be operable to navigate the balloon to a landing location, in the event the balloon needs to be removed from the network and/or accessed on the ground. Further, it is possible that a balloon may be self-sustaining, such that it does not need to be accessed on the ground. In yet other embodiments, in-flight balloons may be serviced by specific service balloons or another type of service aerostat or service aircraft.

2e) Example Heterogeneous Network

In some embodiments, a high-altitude-balloon network may include super-node balloons, which communicate with one another via optical links, as well as sub-node balloons, which communicate with super-node balloons via RF links. Generally, the optical links between super-node balloons may be configured to have more bandwidth than the RF links between super-node and sub-node balloons. As such, the super-node balloons may function as the backbone of the balloon network, while the sub-nodes may provide sub-networks providing access to the balloon network and/or connecting the balloon network to other networks.

Figure 4:
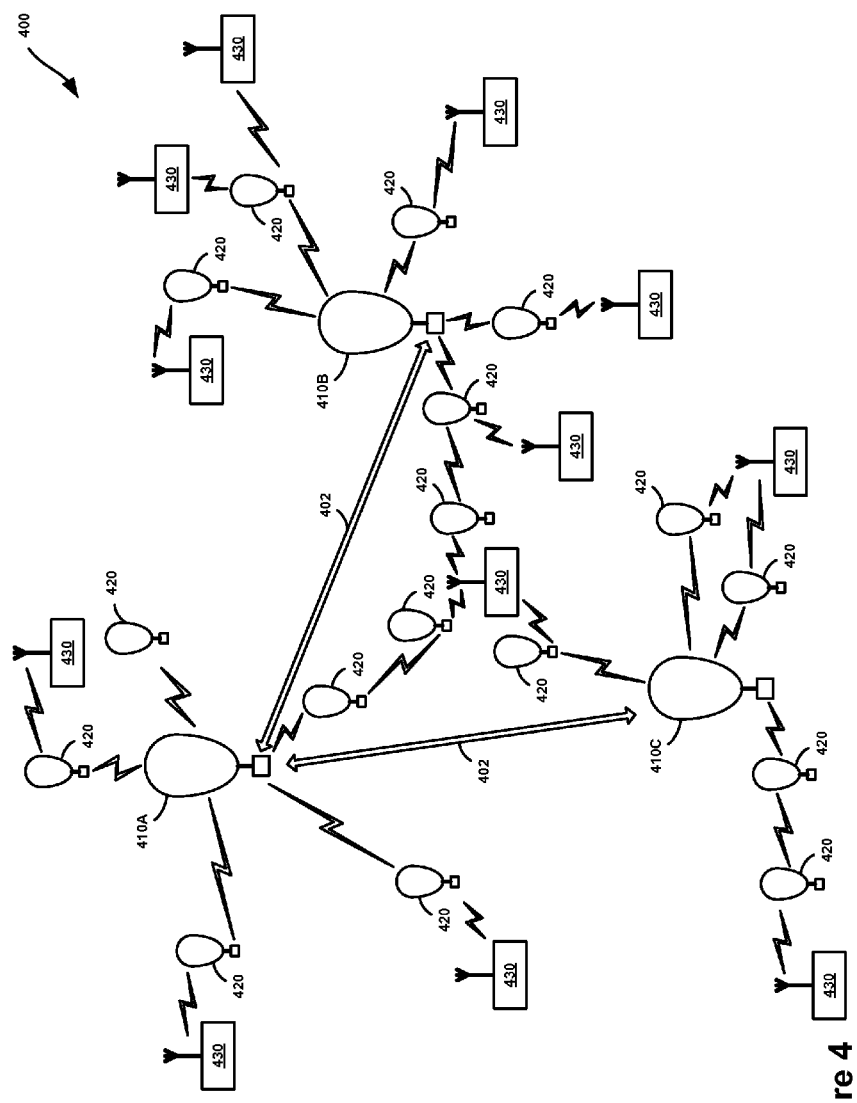
FIG. 4 is a simplified block diagram illustrating a balloon network that includes super-nodes and sub-nodes, according to an example embodiment.

FIG. 4 is a simplified block diagram illustrating a balloon network that includes super-nodes and sub-nodes, according to an example embodiment. More specifically, FIG. 4 illustrates a portion of a balloon network 400 that includes super-node balloons 410A to 410C (which may also be referred to as "super-nodes") and sub-node balloons 420 (which may also be referred to as "sub-nodes").

Each super-node balloon 410A to 410C may include a free-space optical communication system that is operable for packet-data communication with other super-node balloons. As such, super-nodes may communicate with one another over optical links. For example, in the illustrated embodiment, super-node 410A and super-node 401B may communicate with one another over optical link 402, and super-node 410A and super-node 401C may communicate with one another over optical link 404.

Each of the sub-node balloons 420 may include a radio-frequency (RF) communication system that is operable for packet-data communication over one or more RF air interfaces. Accordingly, each super-node balloon 410A to 410C may include an RF communication system that is operable to route packet data to one or more nearby sub-node balloons 420. When a sub-node 420 receives packet data from a super-node 410, the sub-node 420 may use its RF communication system to route the packet data to a ground-based station 430 via an RF air interface.

As noted above, the super-nodes 410A to 410C may be configured for both longer-range optical communication with other super-nodes and shorter-range RF communications with nearby sub-nodes 420. For example, super-nodes 410A to 410C may use using high-power or ultra-bright LEDs to transmit optical signals over optical links 402, 404, which may extend for as much as 100 miles, or possibly more. Configured as such, the super-nodes 410A to 410C may be capable of optical communications at data rates of 10 to 50 GBit/sec or more.

A larger number of high-altitude balloons may then be configured as sub-nodes, which may communicate with ground-based Internet nodes at data rates on the order of approximately 10 MBit/sec. For instance, in the illustrated implementation, the sub-nodes 420 may be configured to connect the super-nodes 410 to other networks and/or directly to client devices.

Note that the data speeds and link distances described in the above example and elsewhere herein are provided for illustrative purposes and should not be considered limiting; other data speeds and link distances are possible.

In some embodiments, the super-nodes 410A to 410C may function as a core network, while the sub-nodes 420 function as one or more access networks to the core network. In such an embodiment, some or all of the sub-nodes 420 may also function as gateways to the balloon network 400. Additionally or alternatively, some or all of ground-based stations 430 may function as gateways to the balloon network 400.

3. Example Approaches for Maintaining a Desired Network Topology

The positions of balloons in a high-altitude balloon network may be adjusted in order to maintain a desired network topology. Maintaining a desired network topology may involve maintaining a desired density of balloons over particular areas, desired altitudes of balloons, a desired arrangement of particular types of balloons (e.g., super-node balloons and sub-node balloons), a desired number of "hops" between different points in the network, and/or any other preferences relating to the placement or arrangement of balloons. For example, it may be desirable to maintain a relatively high density of balloons over densely populated areas (such as cities or metropolitan areas), whereas a relatively low density of balloons may be sufficient over less populated or unpopulated areas (such as deserts or oceans). However, even in relatively unpopulated areas, a certain number and arrangement of balloons may be maintained in order to provide communication connectivity between different portions of the network.

In one approach for maintaining a desired network topology, the positions of balloons may be adjusted relative to locations on the ground. For example, the position of a balloon used for downlink communications could be controlled in order to stay within a communication range of a ground station. Other types of balloons could also be controlled to be within a given a range of a specific ground location. Thus, a desired arrangement of balloons over a metropolitan area could be maintained by controlling the positions of the balloons to be within respective ranges of respective ground positions.

In some cases, there may be an overall flow of balloons through particular areas, for example, because of prevailing winds in the stratosphere. In such cases, a desired network topology can still be maintained based on ground locations. For example, the motion of balloons relative to one another can be controlled so that when a balloon moves out of range of its respective ground location, a replacement balloon also moves into range. Other examples of maintaining a desired network topology based on ground locations are possible.

In another approach for maintaining a desired network topology, the positions of balloons may be adjusted relative to each other. For example, the position of a target balloon may be adjusted relative to one or more neighbor balloons. The determination of which balloons are included as "neighbor balloons" of a target balloon could be made in different ways.

In one example, the neighbor balloons could be taken as the N balloons in the network that are nearest to the target balloon, where N is a predetermined number. N could be as small as one or as large as ten or more. In some cases, N may be selected for a target balloon based on the where the target balloon is located (e.g., N may be larger if the target balloon is over a highly populated area or smaller if the target balloon is over a less populated area).

In another example, any balloons in the network that are within a predefined distance of the target balloon may be identified as neighbor balloons. The predefined distance could depend on where the target balloon is located (e.g., the predefined distance could be smaller if the target balloon is over a highly populated area or larger if the target balloon is over a less populated area). Alternatively, the predefined distance could be taken as the distance over which the target balloon can communicate with other balloons. Thus, any balloons in the network that are within a communication range of the given balloon may be identified as neighbor balloons.

The position of the target balloon may be adjusted based on one or more neighbor balloons in order to maintain a desired distance or a desired range of distances between the target balloon and its neighbor balloons. In this regard, one can imagine a virtual spring between the target balloon and each of its neighbor balloons.

If the distance between the target balloon and a given neighbor balloon is less than the desired distance, then the virtual spring between the target n balloon and the given neighbor balloon may be seen as compressed. The compressed spring may be thought of as exerting a virtual force on the target balloon in a direction away from the given neighbor balloon. This virtual force may result in the target balloon being controlled so as to move away from the given neighbor balloon.

On the other hand, if the distance between the target balloon and the given neighbor balloon is greater than the desired distance, then the virtual spring between the target balloon and the given neighbor balloon may be seen as stretched. The stretched spring may be thought of as exerting a virtual force on the target balloon in a direction toward the given neighbor balloon. This virtual force may result in the target balloon being controlled so as to move toward the given neighbor balloon.

The virtual spring concept may be formalized by using the well-known potential energy function for a spring to assign a "potential energy" to the target balloon as a function of the distance between the target balloon and the neighbor balloon. The following is one example of such a potential energy function: $U=\frac{1}{2}k(r-R)^2$, where U is the potential energy assigned to the target balloon, k is the "spring constant" of the virtual spring, r is the actual distance between the target balloon and the given neighbor balloon, and R is the desired distance between target balloon and the given neighbor balloon.

Given this potential energy function, the virtual force exerted on the target balloon may be expressed as: $F=-k(r-R)$, where F is the virtual force, k is the spring constant of the virtual spring, r is the actual distance between the target balloon and the given neighbor balloon, and R is the desired distance between target balloon and the given neighbor balloon.

Although the above discussion refers to a potential energy and virtual force for a target balloon based on only one neighbor balloon, the approach may be generalized to the case of multiple neighbor balloons. In particular, each of the multiple neighbor balloons may be associated with an individual potential energy function, which could be a function of the respective distance between the target balloon and the neighbor balloon in the form described above. Thus, the $i^{th}$ neighbor balloon may be associated with an individual potential energy function as follows: $U_i=\frac{1}{2}k_i(r_i-R_i)^2$, where $U_i$ is the $i^{th}$ neighbor balloon's contribution to the potential energy of the target balloon, $k_i$ is the spring constant for the virtual spring between the target balloon and the $i^{th}$ neighbor balloon, $r_i$ is the actual distance between the target balloon and the $i^{th}$ neighbor balloon, and $R_i$ is the desired distance between the target balloon and the $i^{th}$ neighbor balloon. As this expression indicates, different neighbor balloons may be associated with different desired distances and/or different spring constants. The different parameters could reflect, for example, differences in the types or functions of the balloons. For instance, the desired distances to neighbor balloons that are supernodes may be different than the desired distances to neighbor balloons that are sub-nodes. Other differences are also possible.

The overall potential energy function for the target balloon may be taken as the sum of the individual potential energy functions from each of its neighbor balloons: $U=\Sigma U_i$. The virtual force exerted on the target balloon may be related to the gradient of the overall potential energy function as follows: $\vec{F}=-\nabla U$. Of course, this virtual force can also considered to be the vector sum of individual virtual forces exerted on the target balloon by each of its neighbor balloons: $\vec{F}=\Sigma \vec{F_i}$.

Because the virtual force exerted on a target balloon includes contributions from each of its neighbor balloons, it is possible for the target balloon to move in the general direction of a neighbor balloon that is already closer than the desired distance (e.g., because another neighbor balloon may be even closer). It is also possible for the target balloon to move generally away from a neighbor balloon that is already farther than the desired distance (e.g., in order to come closer to another neighbor balloon that is even more distant). These points are illustrated by scenario 500 shown in FIG. 5.

In scenario 500, a target balloon 502 is shown at the origin of x-y coordinate axes, and the locations of four neighbor balloons (neighbor balloons 504, 506, 508, and 510) are indicated by vectors $\vec{r}_1$, $\vec{r}_2$, $\vec{r}_3$, and $\vec{r}_4$. As shown, neighbor balloon 504 is in the first quadrant, neighbor balloon 506 is in the second quadrant, neighbor balloon 508 is in the third quadrant, and neighbor balloon 510 is in the fourth quadrant. It is to be understood that this arrangement is merely one example that is presented for purposes of illustration. Target balloon 502 could have a greater or fewer number of neighbor balloons, and the neighbor balloons could be located differently than shown in FIG. 5.

Figure 5:
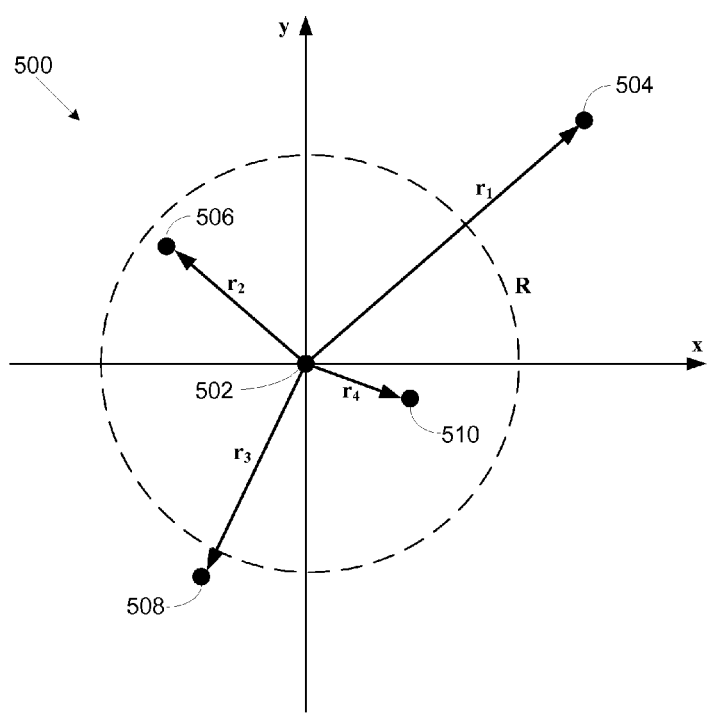
FIG. 5 illustrates a scenario for determining a desired movement of a target balloon based on the locations of four neighbor balloons, according to an example embodiment.

The x-y coordinates in FIG. 5 may represent ground coordinates. Thus, in addition to coordinates in the x-y plane, each of balloons 502-510 may have respective z-coordinates (i.e., altitudes) which are not indicated in FIG. 5. Further, the discussion of distances between balloons in scenario 500 may refer to lateral distances in the x-y plane, which do not take into account altitude differences between balloons.

Scenario 500 assumes that the target balloon 502 has the same desired distance, R, to each of the neighbor balloons 504-510. This desired distance is indicated by the dashed circle in FIG. 5. As shown, neighbor balloons 504 and 508 are more than the desired distance away from target balloon 502, whereas neighbor balloons 506 and 510 are less than the desired distance away from target balloon 502.

Each of neighbor balloons 504-510 may exert a respective virtual force on target balloon 502 based on the "virtual spring" model described above. The net virtual force acting on target balloon 502 will be the vector sum of the virtual forces exerted by neighbor balloons 504-510. In particular, neighbor balloons 504 and 508 will both exert an attractive force on target balloon 502 since they are both more than the desired distance away from target balloon 502. However, neighbor balloon 504 is more distant than neighbor balloon 508. Thus, neighbor balloon 504 may exert a greater attractive force than neighbor balloon 508. The net effect of these attractive forces may be a virtual force toward the first quadrant where neighbor balloon 504 is located. Similarly, neighbor balloons 506 and 510 will both exert a repulsive force on target balloon 502 since they are both less than the desired distance away from target balloon 502. However, neighbor balloon 510 is closer than neighbor balloon 506. Thus, neighbor balloon 510 may exert a greater repulsive force than neighbor balloon 506. The net effect of these repulsive forces may be a virtual force toward the second quadrant where neighbor balloon 506 is located. Thus, in scenario 500, the overall virtual force on target balloon 502, which results from the net attractive forces and the net repulsive forces, may be in a direction that is generally along the positive y-axis.

The virtual force acting on target balloon 502 may be used to determine a desired movement of target balloon 502. The desired movement could be, for example, a desired velocity, a desired change in velocity, a desired acceleration, or a desired displacement. Further, the desired movement could be a horizontal movement (i.e., a movement in the x-y plane), or the desired movement could include a desired change in altitude. The target balloon 502 could be controlled (e.g., using a controller in target balloon 502 or through remote control) in order to try to achieve the desired movement, as described in more detail below.

The direction of the desired movement could be based on the direction of the virtual force, and the magnitude of the desired movement could be based on the magnitude of the virtual force. Thus, if the desired movement is a desired velocity, then the direction of the desired velocity may correspond to the direction of the virtual force, and the magnitude of the desired velocity may be a function of the magnitude of the virtual force. In this way, a greater virtual force may result in a greater velocity. If the desired movement is a desired displacement (i.e., a desired distance of travel in a desired direction), then the desired distance of travel may be a function of the magnitude of the virtual force and the desired direction of travel may correspond to the direction of the virtual force. In this way, a greater virtual force may result in a greater distance of travel. Thus, whether the desired movement is defined in terms of displacement, velocity, acceleration, or some other parameter, the magnitude of the desired movement of target balloon 502 may be larger or smaller depending on the magnitude of the virtual force acting on target balloon 502.

Although the above discussion refers to potential energy functions that are based on virtual springs, it is to be understood that other types of potential energy functions could be used. In general, the potential energy, U, of a target balloon may be a function of the locations of the target balloon and n neighbor balloons: $U(\vec{r}_0, \vec{r}_1, \vec{r}_2, \ldots \vec{r}_n)$, where n is an integer greater than or equal to one, vector $\vec{r}_0$ corresponds to the location of the target balloon, and vectors $\vec{r}_1$, $\vec{r}_2$, through $\vec{r}_n$ correspond to the locations of the n neighbor balloons. The locations of the target balloon and the neighbor balloon may be in terms of either ground coordinates (i.e., coordinates in the x-y plane) or to coordinates that include altitude (i.e., coordinates) in xyz space.

In some embodiments, the potential energy could be a function of the distances between the target balloon and each of the n neighbor balloons. For example, the potential energy, U, could have the following functional form: $U=\Sigma u_i(|\vec{r}_0-\vec{r}_i|)$, where $u_i$ is a function that is specific to the $i^{th}$ neighbor balloon, and the sum is taken over i=1 to n. The $u_i$ functions could be different for different neighbor balloons, or they could be the same or similar for different neighbor balloons. For instance, the $u_i$ functions could each correspond to potential energy functions based on virtual springs, as discussed above.

The virtual force may be related to the gradient of the potential energy function, as follows: $\vec{F}=-\nabla U(\vec{r}_0, \vec{r}_1, \vec{r}_2, \ldots \vec{r}_n)$, where the gradient is determined by taking partial derivatives with respect to the coordinates of the target balloon. As discussed above, the desired movement of the target balloon could be based on the virtual force and, thus, based on the gradient of the potential energy function.

The desired movement of the target balloon could also be determined from the potential energy function in other ways. For example, the potential energy function may have a minimum at coordinates that correspond to a desired location of the target balloon. In that case, the desired movement could be a movement toward the desired location, i.e., a movement that minimizes the potential energy function. Other methods could also be used to determine a desired motion of the target balloon based on the potential energy function.

Two approaches for maintaining a desired network topology are discussed above: an approach based on adjusting the positions of balloons relative to ground locations and an approach based on adjusting the positions of balloons relative to each other. In addition, these two approaches could be combined. For example, the position of a target balloon could be adjusted using an algorithm that takes into account its location relative to one or more ground locations as well as its location relative to one or more neighbor balloons. The algorithm may involve a potential energy function that includes contributions associated with the distances between the target balloon and n neighbor balloons and contributions associated with the distances between the target balloon and p ground locations. The potential energy function could be as follows: $U=\Sigma u_i(|\vec{r}_0-\vec{r}_i|)+\Sigma v_j(|\vec{r}_0-\vec{g}_j|)$, where vector $\vec{r}_0$ corresponds to the location of the target balloon, vectors $\vec{r}_i$ correspond to the locations of the n neighbor balloons, $u_i$ is a function that is specific to the $i^{th}$ neighbor balloon, vectors $\vec{g}_j$ correspond to the locations of the p ground locations, $v_j$ is a function that is specific to the $j^{th}$ ground location, i=1 to n, and j=1 to p. The desired movement of the target balloon may then be determined by taking the gradient of the potential energy function, by minimizing the potential energy function, or in some manner.

The concept of a potential energy function may be further generalized as a "goodness" function that can take into account multiple different kinds of "goodness" factors. Such "goodness" factors may relate to the spacing between balloons, ground locations, altitudes, the wind speeds that exist near balloons, and/or other types of considerations. For example, k "goodness" factors may be identified for a given balloon. For each "goodness" factor, a current "goodness" score, $G_i$, where i=1 to k, may be determined for the given balloon.

One possible "goodness" factor could be an altitude factor that provides a better "goodness" score for a lower altitude. This type of "goodness" factor may reflect a principle that, all things being equal, it is better for a balloon to be lower than higher in order to get a better RF connection with the ground. Another possible "goodness" factor could be a geographic location factor that provides a better "goodness" score for being over certain, desired geographic areas and/or a lower "goodness" score for being over certain geographic areas that should be avoided. This type of "goodness" factor may reflect a principle that, all things being equal, it is better to be over certain geographic areas than others. For example, being over the open ocean may, in general, be associated with a negative "goodness" score. However, being over shipping lanes in the ocean may be associated with a positive "goodness" score. Other types of factors are also possible.

In addition to determining k "goodness" scores for k "goodness" factors of a given balloon, it may be possible to consider various actions that the given balloon might take in order to improve one or more of these "goodness" scores. Such actions may include, for example, a movement in a particular direction. The movement could be a horizontal movement (i.e., a change in ground position), a vertical movement (i.e., a change in altitude), or a combination of horizontal and vertical movements. The action could also be an adjustment in the balloon's buoyancy, an adjustment of an airfoil (a kit, wing, or sail), or some other type of adjustment that may affect how the balloon moves in response to ambient winds or under its own power.

A given action, A, may improve one or more "goodness" scores of a given balloon. However, the action might also adversely affect one or more other "goodness" scores of the given balloon. Thus, each "goodness" score, $G_i$, may be considered a function of the action A, so that we have $G_i(A)$ for the given balloon, where i=1 to k. The overall effect of the action, A, may be determined by calculating an "overall goodness," O, as a function of the individual "goodness" scores: $O=W(G_1(A), \ldots, G_k(A))$. The function, W, could be any weighting function that determines how each "goodness" score contributes to the "overall goodness." For example, the "goodness" scores could have equal weight, so that the "overall goodness" could simply be the sum of the individual "goodness" scores. Alternatively, some "goodness" scores could be weighted more heavily than others, or the relative weightings could be dependent on the scores themselves.

The merits of a particular action, A, for a given balloon can be determined by calculating the resulting "overall goodness," O, for that given balloon. Various different actions may be evaluated in this way, and the action that maximizes O may be taken as the desired action. The given balloon may then be controlled to undertake the desired action.

By controlling individual balloons based on "goodness" factors, a desired network topology may be achieved. The desired network topology could be, in a simple case, a network in which the balloons maintain an equal spacing. However, when "goodness" factors other than relative spacing are considered, the desired network topology could be more complicated. For example, the relative spacing between balloons could be higher in some areas than in others.

It is also possible to use different techniques for achieving a desired network topology at different times. For example, a default adjustment technique might be applied under typical conditions. However, certain undesirable conditions (such as excessive balloon density) may develop for which a different kind of adjustment technique may be applied temporarily (e.g., until the undesirable condition is alleviated).

As one example, when the density of balloons in a particular area becomes undesirably high, the balloons in that area might "draw lots" in some way (any type of low-probability random selection) to select one or more balloons to leave the group. A selected balloon could increase or decrease its altitude until it achieves a speed and direction that is meaningfully different from that of the group. The selected balloon may then maintain this different speed and direction for a sufficient period of time in order to "randomize" the distribution of balloons. At that point, the default adjustment technique may be re-applied. This randomization technique can be used to break up clumps of balloons, with a low probability of clumps re-forming.

4. Example Methods for Achieving a Desired Movement

As noted above, a desired network topology may be maintained by adjusting the positions of individual balloons in the balloon network. The adjustment in the position of a particular, target balloon may involve determining a desired movement of the target balloon (e.g., based on a potential energy function) and controlling the target balloon to achieve the desired movement. The desired movement of the target balloon could be achieved in different ways.

In one approach, a desired horizontal movement of the target balloon may be achieved by adjusting the altitude of the target balloon. In this regard, the winds in the stratosphere typically follow a pattern in which the wind speed decreases with increasing altitude for altitudes between about 15 km and 20 km, reaching a local minimum between about 20 km and 25 km, and then increases with increasing altitude thereafter. To the extent that the target balloon is moving as a result of ambient winds, the motion of the target balloon can be adjusted by either increasing or decreasing its altitude. For example, altitude control may be used to achieve a desired horizontal movement of the target balloon by determining that the desired horizontal movement of the target balloon can be achieved by exposing the target balloon to ambient winds of a particular velocity, determining that ambient winds of the particular velocity are likely to be available at a particular altitude (this determination could be made based on predictive models and/or actual measurements of the winds in the vicinity of the target balloon), and adjusting the altitude of the target balloon to attain the particular altitude.

The altitude-adjustment approach can be used in any balloon that is configured for altitude control. For example, as discussed above, a balloon may include a variable buoyancy system that can change the volume and/or density of the gas within the balloon's envelope. However, the altitude-adjustment approach generally relies on the ambient winds to carry the target balloon in the desired direction. Other approaches may be used to move the target balloon in a direction that is different than that of the ambient winds.

For example, the target balloon may include an airfoil, such as a kite, wing, or sail, that can be adjusted to control the target balloon's direction of motion. In particular, the airfoil may be operable to move the target balloon horizontally using ambient winds, but in a direction that may be controllable (to at least some extent) by appropriate adjustment of the airfoil.

Alternatively, the airfoil may be of a type that is operable to convert vertical motion of the target balloon (the vertical motion may be generated by changing the buoyancy of the target balloon) into horizontal motion of the target balloon. This type of airfoil can be used to achieve the desired movement of the target balloon without relying on ambient winds. This approach may be thought of as using the airfoil to convert lift into thrust, which is essentially the opposite of how a conventional airplane works (the wings of a conventional airplane convert thrust into lift).

In some embodiments, the target balloon may be configured for powered flight. For example, the target balloon may include a propeller, jet, or other propulsion mechanism. These propulsion mechanisms may be used to achieve the desired movement of the target balloon instead of or in addition to the use of ambient winds. Because of the energy that they consume, such propulsion mechanisms could be used as a backup, for example, when the available ambient winds are insufficient to provide the desired movement.

Figure 6:
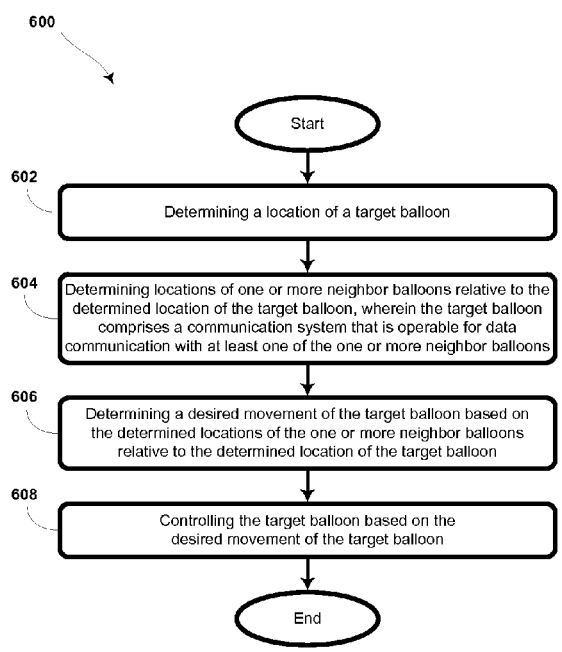
FIG. 6 is a flowchart illustrating a method, according to an example embodiment.

5. Example Methods for Controlling a Target Balloon Based on the Relative Locations of Neighbor Balloons FIG. 6 is a flowchart illustrating an example method 600 for controlling a target balloon based on the relative locations of neighbor balloons. Method 600 could be performed using any of the apparatus shown in FIGS. 1-5 and described above. However, other configurations could be used. Further, the steps shown in FIG. 6 for method 600 are for one particular embodiment. In other embodiments, the steps may appear in different order and steps could be added or subtracted.

Step 602 involves determining a location of a target balloon. The target balloon could be any balloon whose movement may be controlled, for example, in order to achieve a desired network topology in a balloon network. For purposes of illustration, this example assumes that the target balloon network is in a high-altitude network of balloons that functions as a mesh network. However, other types of balloon networks are possible.

The target balloon could be configured as shown in FIG. 3, or it could be differently configured. The location of the target balloon could be determined using GPS, inertial navigation data, star-tracking, radar, or by some other method. The location of the target balloon could be determined by a positioning system within the target balloon, such as positioning system 324 shown in FIG. 3. Alternatively, the location of the target balloon could be determined externally, for example, by another balloon, by a ground-based station, or by some other entity.

Step 604 involves determining locations of one or more neighbor balloons relative to the determined location of the target balloon. The target balloon includes a communication system that is operable for data communication with at least one of the one or more neighbor balloons. The communication system may, for example, use a free-space optical link or an RF link for the data communication.

The one or more neighbor balloons may be identified in various ways. In some embodiments, a predetermined number of balloons in the mesh network that are nearest neighbors to the target balloon may be identified as the one or more neighbor balloons. In other embodiments, any balloons in the mesh network that are within a predefined distance from the target balloon may be identified as the one or more neighbor balloons. The predefined distance could, for example, correspond to a communication range of the target balloon's communication system. Other ways of defining which balloons in the mesh network are neighbor balloons to the target balloon are also possible.

The locations of the one or more neighbor balloons could be determined using GPS, inertial navigation data, star-tracking, radar, or by some other method. The locations of the neighbor balloons could be determined by the neighbor balloons themselves, and this location information could be transmitted to the target balloon, to a ground-based station, or to some other entity. Alternatively, the locations of the one or more neighbor balloons could be determined by the target balloon or by a ground-based station. Other methods for determining the locations of the one or more neighbor balloons are also possible.

Step 606 involves determining a desired movement of the target balloon based on the determined locations of the one or more neighbor balloons relative to the determined location of the target balloon. The desired movement of the target balloon could be a desired displacement of the target balloon (such as displacement to a particular location or displacement in a certain direction for a certain distance or duration of travel), a desired velocity of the target balloon (the desired velocity could be relative to the ground, relative to the air, or relative to another balloon), a desired change in the velocity of the target balloon (either an increase or decrease in the target balloon's current speed and/or a change in the target balloon's current direction of motion), a desired acceleration of the target balloon, or any other type of movement of the target balloon.

This desired movement could be determined based on a potential energy function, as described above. Thus, a potential energy function may be defined to assign a potential energy to the target balloon as a function of the determined locations of the one or more neighbor balloons and the determined location of the target balloon. A gradient of the potential energy function may be determined, and the desired movement of the target balloon may be determined based on the gradient of the potential energy function. In particular, the direction of the desired movement may be based on the direction of the gradient and the magnitude of the desired movement may be based on the magnitude of the gradient.

Step 608 involves controlling the target balloon based on the desired movement of the target balloon. In some embodiments, the target balloon may control itself autonomously to achieve the desired movement, using data that the target balloon collects itself or receives through its communication system. In other embodiments, the target balloon may be controlled remotely by another balloon, by a ground-based station, or by some other entity.

In some embodiments, the desired movement of the target balloon may include a desired horizontal movement (i.e., a movement that is generally parallel to the ground). The desired horizontal movement of the target balloon may be achieved in various ways.

In one approach, the altitude of the target balloon of the target balloon may be controlled in order to achieve the desired horizontal movement of the target balloon. This approach makes use of the variation of wind speed with altitude that is typical in the stratosphere. For example, the buoyancy of the target balloon may be adjusted to attain a particular altitude where ambient ways may be expected to produce the desired horizontal movement of the target balloon. In some embodiments, the target balloon may use its own predictive models and/or actual data regarding wind speeds. Alternatively, the target balloon may receive wind data or wind predictions from other balloons, ground-based stations, and/or other entities.

In another approach, the target balloon may include an airfoil, such as a kite, wing, or sail, that can use ambient winds to achieve the desired horizontal movement of the target balloon. For example, the airfoil could be controllable to achieve a desired direction of movement.

In still another approach, the target balloon may include an airfoil that is operable to convert vertical motion of the target balloon into the desired horizontal movement of the target balloon. The vertical motion of the target balloon may be generated by changing the buoyancy of the target balloon.

In yet another approach, the target balloon may include a propulsion mechanism, such as a propeller or jet. The target balloon may control the propulsion mechanism in order to achieve the desired horizontal movement.

It is to be understood that method 600 shown in FIG. 6 may be performed repetitively, in order to adjust the position of the target balloon based on changing conditions. In some embodiments, method 600 may be performed periodically, for example, every second, minute, or hour. In other embodiments, method 600 may be performed in response to a triggering event. For example, the target balloon may perform the method in response to receiving an instruction from another balloon, ground-based station, or some other entity.

It is also to be understood that method 600 shown in FIG. 6 may be performed in order to adjust the positions of multiple balloons in a balloon network. The method could be performed for each balloon independently. Alternatively, a central controller, which could be in a balloon or in a ground-based station, may perform the method for multiple balloons in a cooperative fashion. Either way, the positions of balloons in a balloon network may be adjusted relative to one another in order to maintain a desired network topology.

6. Non-transitory Computer Readable Media

Some or all of the functions described above and illustrated in FIGS. 1-6 may be performed by a computing device in response to the execution of instructions stored in a non-transitory computer readable medium. The non-transitory computer readable medium could be, for example, a random access memory (RAM), a read-only memory (ROM), a flash memory, a cache memory, one or more magnetically encoded discs, one or more optically encoded discs, or any other form of non-transitory data storage. The non-transitory computer readable medium could also be distributed among multiple data storage elements, which could be remotely located from each other. The computing device that executes the stored instructions could be a computing device in a balloon, such as a computing device corresponding to processor 312 illustrated in FIG. 3. Alternatively, the computing device that executes the stored instructions could be in another entity, such as a ground-based station.

Conclusion

The above detailed description describes various features and functions of the disclosed systems, devices, and methods with reference to the accompanying figures. While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A method comprising:
   determining a location of a target balloon;
   determining locations of one or more neighbor balloons relative to the determined location of the target balloon, wherein the target balloon comprises a communication system that is operable for data communication with at least one of the one or more neighbor balloons;
   determining a desired movement of the target balloon based on the determined locations of the one or more neighbor balloons relative to the determined location of the target balloon, wherein the desired movement of the target balloon comprises a desired horizontal movement of the target balloon; and
   controlling the target balloon based on the desired movement of the target balloon, wherein controlling the target balloon based on the desired movement of the target balloon comprises controlling an altitude of the target balloon based on the desired horizontal movement of the target balloon.

2. The method of claim 1, wherein controlling the altitude of the target balloon based on the desired horizontal movement of the target balloon comprises:
   determining that the desired horizontal movement of the target balloon can be achieved by exposing the target balloon to ambient winds of a particular velocity;
   determining that ambient winds of the particular velocity are likely to be available at a particular altitude; and
   adjusting the altitude of the target balloon to attain the particular altitude.

3. The method of claim 1, wherein the target balloon and one or more neighbor balloons are high-altitude balloons.

4. The method of claim 1, wherein the desired movement of the target balloon comprises a desired direction of movement.

5. The method of claim 1, wherein the desired movement of the target balloon comprises a desired velocity.

6. The method of claim 1, wherein the desired movement of the target balloon comprises a desired distance of travel in a desired direction.

7. The method of claim 1, wherein the communication system comprises a free-space optical communication system.

8. The method of claim 1, wherein the communication system comprises a radio frequency (RF) communication system.

9. The method of claim 1, wherein the target balloon and one or more neighbor balloons are part of a mesh network of balloons.

10. The method of claim 9, further comprising identifying a predetermined number of nearest balloons in the mesh network as the one or more neighbor balloons.

11. The method of claim 9, further comprising identifying any balloons in the mesh network that are within a predefined distance from the target balloon as the one or more neighbor balloons.

12. The method of claim 9, further comprising identifying any balloons in the mesh network that are within a communication range of the target balloon's communication system as the one or more neighbor balloons.

13. The method of claim 1, wherein determining a desired movement of the target balloon based on the determined locations of one or more neighbor balloons relative to the determined location of the target balloon comprises:

defining a potential energy function that assigns a potential energy to the target balloon as a function of the determined locations of the one or more neighbor balloons and the determined location of the target balloon;

determining a gradient of the potential energy function; and determining the desired movement of the target balloon based on the gradient of the potential energy function.

14. The method of claim 13, wherein determining the desired movement of the target balloon based on the gradient comprises:

determining a direction of the gradient; and determining a direction of the desired movement of the target balloon based on the direction of the gradient.

15. The method of claim 13, wherein determining the desired movement of the target balloon based on the gradient comprises:

determining a magnitude of the gradient; and determining a magnitude of the desired movement of the target balloon based on the magnitude of the gradient.

16. The method of claim 1, wherein the target balloon comprises an airfoil.

17. The method of claim 16, wherein the airfoil comprises a kite, wing, or sail.

18. The method of claim 16, wherein controlling the target balloon based on the desired movement of the target balloon comprises controlling the airfoil.

19. The method of claim 16, wherein the airfoil is operable to move the target balloon horizontally using ambient winds.

20. The method of claim 16, wherein the airfoil is operable to convert vertical motion of the target balloon into horizontal motion of the target balloon, and wherein controlling the target balloon based on the desired movement of the target balloon comprises controlling a buoyancy of the target balloon.

21. A balloon, comprising:

a communication system operable for data communication with one or more other balloons in a mesh network of balloons; and a controller coupled to the communication system, wherein the controller is configured to:

(a) determine the balloon's location;

(b) determine locations of one or more neighbor balloons relative to the balloon's determined location, wherein the one or more neighbor balloons are in the mesh network of balloons;

(c) determine a desired movement of the balloon based on the determined locations of the one or more neighbor balloons relative to the balloon's determined location, wherein the desired movement of the balloon comprises a desired horizontal movement of the balloon; and (d) control an altitude of the balloon based on the desired horizontal movement.

22. The balloon of claim 21, further comprising:

an altitude-control system that is operable to adjust the altitude of the balloon, wherein the controller is configured to control the altitude-control system based on the desired horizontal movement of the balloon.

23. The balloon of claim 21, wherein the controller is configured to determine the balloon's location using a satellite-based positioning system.

24. The balloon of claim 21, wherein the controller is configured to determine the locations of the one or more neighbor balloons based on information received through the communication system.

\* \* \* \* \*

UNITED STATES PATENT AND TRADEMARK OFFICE
CERTIFICATE OF CORRECTION

PATENT NO.        : 8,820,678 B2
APPLICATION NO.   : 13/346637
DATED             : September 2, 2014
INVENTOR(S)       : Richard Wayne DeVaul et al.

It is certified that error appears in the above-identified patent and that said Letters Patent is hereby corrected as shown below:

In The Claims

Claim 21, Column 26, line 21, after "horizontal movement", insert --of the balloon--

Signed and Sealed this
Fourteenth Day of April, 2015

Michelle K. Lee
*Director of the United States Patent and Trademark Office*